United States Patent
Sergeev et al.

(10) Patent No.: US 11,637,699 B2
(45) Date of Patent: Apr. 25, 2023

(54) ROLLOVER OF ENCRYPTION KEYS IN A PACKET-COMPATIBLE NETWORK

(71) Applicant: ADVA Optical Networking SE, Martinsried/Munich (DE)

(72) Inventors: Andrew Sergeev, Kfar Saba (IL); Joo Yeon Cho, Wolfratshausen (DE)

(73) Assignee: ADVA Optical Networking SE, Martinsried/Munich (DE)

( * ) Notice: Subject to any disclaimer, the term of this patent is extended or adjusted under 35 U.S.C. 154(b) by 0 days.

(21) Appl. No.: 17/380,149

(22) Filed: Jul. 20, 2021

(65) Prior Publication Data

US 2022/0029800 A1    Jan. 27, 2022

(30) Foreign Application Priority Data

Jul. 21, 2020    (EP) .................................... 20186999

(51) Int. Cl.
G06F 21/00 (2013.01)
H04L 29/06 (2006.01)
H04L 9/08 (2006.01)

(52) U.S. Cl.
CPC .......... H04L 9/0891 (2013.01); H04L 9/0841 (2013.01); H04L 9/0852 (2013.01); H04L 9/0869 (2013.01)

(58) Field of Classification Search
None
See application file for complete search history.

(56) References Cited

U.S. PATENT DOCUMENTS

2010/0091993 A1* 4/2010 Iwama ................. H04L 9/0891
380/273
2011/0188659 A1* 8/2011 Khalid ................. H04L 9/0852
380/278
(Continued)

FOREIGN PATENT DOCUMENTS

JP    2019057044 A  *  4/2019  ........... G06F 21/602

(Continued)

OTHER PUBLICATIONS

"Chapter 12: Key establishment protocols ED—Menezes A J; Van Oorschot P C; Vanstone S A", XP001525012.
(Continued)

*Primary Examiner* — Lisa C Lewis
(74) *Attorney, Agent, or Firm* — Wiggin and Dana LLP

(57) ABSTRACT

There is provided a technique of establishing encryption keys for communication between $1^{st}$ peer and $2^{nd}$ peer via a data path. The technique comprises: by each peer, using input keying material to independently generate equivalent pairs of peer encryption keys (PEKs), verifying equivalence of the generated PEK pairs, and using by $1^{st}$ peer and $2^{nd}$ peer the verified PEK pairs to become in possession of equivalent pairs of session encryption keys (SEKs). Verifying comprises: generating by $1^{st}$ peer a first handshake (HS) message encrypted by PEK Tx1 and sending the first HS message to the $2^{nd}$ peer via the data path; decrypting by the $2^{nd}$ peer the first HS message using the PEK Rx2, generating a second HS message encrypted by PEK Tx2, and sending the second HS message to the $1^{st}$ peer via the data path; and decrypting the second HS message by the $1^{st}$ peer using PEK Rx1.

20 Claims, 8 Drawing Sheets

---

By each peer, using input keying material independently received from one or more SKM to independently generate a pair of Tx and Rx peer encryption keys (PEKs), wherein the pairs have equal values of corresponding PEKs (201)

↓

Generating by a 1st peer (initiator) a handshake (HS) initiating message encrypted by Tx key from the generated 1st PEK pair (202), and sending the encrypted initiating HS message via data path as encrypted traffic packet to a 2nd peer (responder) (203)

↓

Decrypting by the responder the received initiating HS message using Rx key from the generated 2nd PEK pair (204)

↓

Upon successful decryption of the initiating HS message, sending by the responder to the initiator a HS acknowledgement message encrypted by Tx key from the 2nd PEK pair, the message sent via the data path as encrypted traffic packet (205)

↓

Upon successful decryption (206) of Ack HS message using Rx key from the 1st PEK pair, using the key values of the 1st and 2nd PEK pairs to obtain a shared SEK pair for 1st peer – to - 2nd peer encrypted communication via the data channel (207)

(56) References Cited

U.S. PATENT DOCUMENTS

| | | |
|---|---|---|
| 2011/0252231 A1 | 10/2011 | Mishra |
| 2017/0237718 A1* | 8/2017 | Chen .................... H04L 9/0838 |
| | | 713/168 |
| 2019/0044875 A1* | 2/2019 | Murty .................... H04L 45/24 |
| 2019/0245683 A1 | 8/2019 | Narayanan et al. |
| 2019/0288842 A1 | 9/2019 | Weis et al. |
| 2020/0169401 A1 | 5/2020 | Dooley et al. |
| 2020/0213111 A1 | 7/2020 | Leavy et al. |

OTHER PUBLICATIONS

"Post-quantum MACsec Key Agreement for Ethernet Networks" by Joo Yeon Cho and Andrew Sergeev, 15th International Conference on Availability, Reliability and Security (ARES 2020), Aug. 25-28, 2020, Virtual Event, https://doi.org/10.1145/3407023.3409220.

* cited by examiner

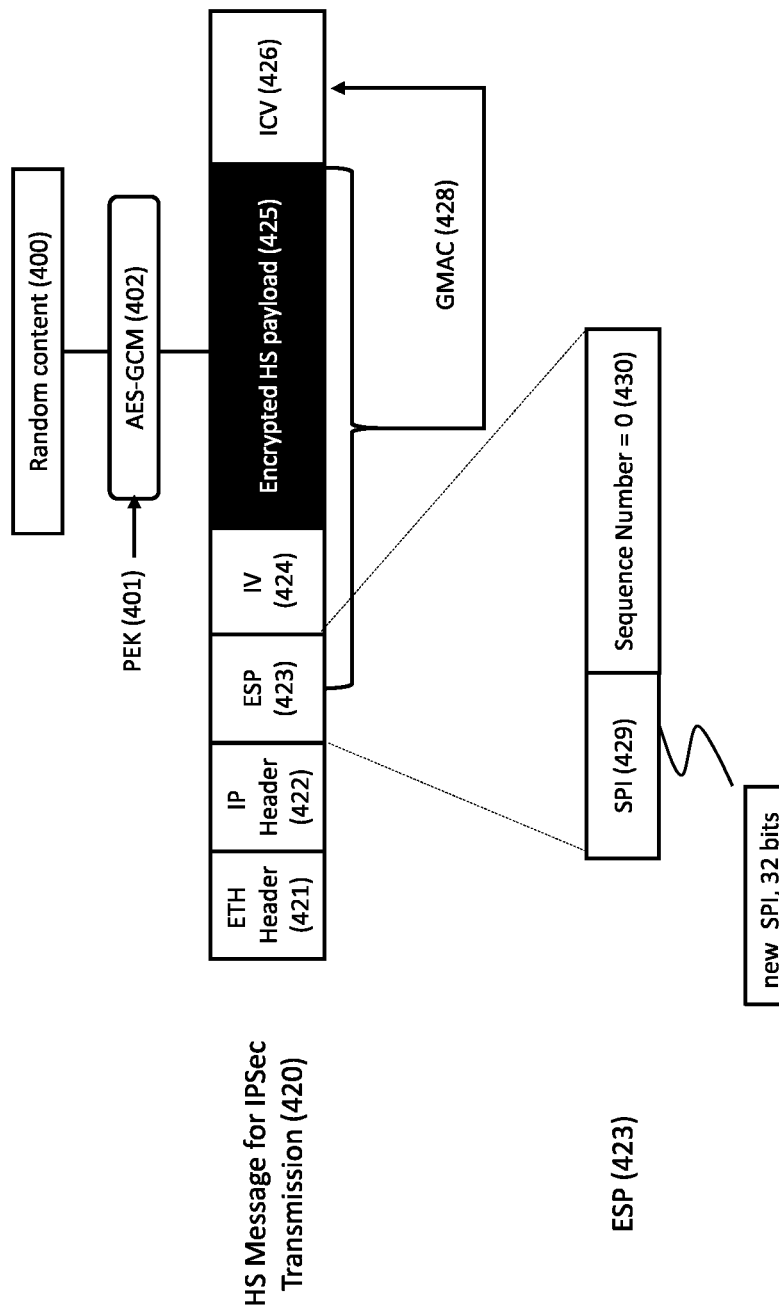

ROLLOVER OF ENCRYPTION KEYS IN A PACKET-COMPATIBLE NETWORK

TECHNICAL FIELD

The presently disclosed subject matter relates to the field of secure data communication, and, more particularly, to rollover of encryption keys in a packet-compatible data network (PDN).

BACKGROUND

Secure communication, being an essential requirement for a variety of applications, can be achieved through data encryption. Data encryption and the exchange of encrypted data are usually implemented using cryptographic keys distributed to different network entities. The encryption cryptographic keys (referred to hereinafter also as "encryption keys") enable the respective network entities to encrypt data to be sent or to decrypt data received by the network entity. Cryptographic keys are also usable in other cryptographic operations, as, for example, authentication and authorization.

In symmetric-key cryptography, the same encryption key is used for both encryption and decryption of a certain message. Accordingly, in symmetric cryptography, transmitting and receiving entities have possession of the equivalent pairs each comprising a Tx key usable for transmission and a Rx key usable for receiving (optionally, the values of Tx and Rx keys can be the same). In asymmetric cryptography, also known as "public-key" cryptography, each individual entity is assigned a unique key pair that includes a public key and a private key, while the private key is known only to an entity, and the public key can be openly distributed.

Encryption keys used by network entities are subject to periodic rollover, during which the keys for one or more network entities are changed. Accordingly, there is a need for a reliable and efficient process for rollover of encryption keys in a network.

Problems of rollover of encryption keys have been recognized in the conventional art and various techniques have been developed to provide solutions, for example:

US Application No. 2011/0252231 discloses a technique of rekey process. In certain rekey embodiments, when a key-generation protocol exchange is executed, instead of generating a single new security relationship, such as a Security Association or SA, a multiple set (e.g., 10) of new security relationships (e.g., SAs) are generated. An authorized device can then individually use these security relationships (e.g., SAs) as needed to securely communicate with each other. For example, a set of SAs can be efficiently programmed into an 802.1ae protocol ASIC for handling transmitted and received data packets.

US Application No. US2019/0245683 discloses an automated changeover of a transfer encryption key from one transfer encryption key to another when a set of computing systems are to share one or more keys (such as a private and public key pair). The transfer encryption key is used to encrypt communications of the key(s) such that the encrypted key(s) may be transferred over a transfer system without the transfer system having access to the key(s). In order to perform automated changeover of the transfer encryption key, one of the set of computing systems encrypts the next transfer encryption key with the prior transfer encryption key. The transfer system provides this encrypted message to the remainder of the set of computing systems, which may then decrypt the encrypted message using the prior transfer encryption key, to find the next transfer encryption key.

US Application No. US2019/0288842 discloses techniques for encryption key rollover synchronization in a network. In one embodiment, a method includes generating a new set of public-key encryption keys for a first network element. Based on the new set of public-key encryption keys, a set of new security associations between the first network element and each other network element in the network is generated. The method includes providing a new public key from the new set of public-key encryption keys to a network controller and using security associations associated with a previous set of public-key encryption keys for encrypted communication between the first network element and each other network element. Upon obtaining, from a second network element, traffic protected by a security association from the set of new security associations, the method includes using the new security associations for subsequent encrypted communication between the first network element and the second network element.

US Application No. US2020/0169401 discloses techniques for changing cryptographic keys in high-frequency transaction environments to mitigate service disruptions or loss of transactions associated with key maintenance. In various embodiments, a server device can employ a working key encrypted with a first master key to decrypt messages being communicated from a client device, whereby each message is encrypted with a first cryptogram that was generated based on the working key encrypted with the first master key. While the working key encrypted with the first master key is being employed, the server device can generate a notification including a second cryptogram generated based on the working key encrypted with a second master key for transmission to the client device. The transmitted notification can cause the client device to encrypt the messages being communicated with the second cryptogram. The server device can concurrently employ the working key encrypted with one of the first and second master keys to decrypt messages received from the client device, whether encrypted with the first cryptogram or the second cryptogram.

The references cited above teach background information that may be applicable to the presently disclosed subject matter for appropriate teachings of additional or alternative details, features and/or technical background.

GENERAL DESCRIPTION

In accordance with certain aspects of the presently disclosed subject matter, there is provided a method of establishing encryption keys for communicating between a first peering computer (1st peer) and a second peering computer (2nd peer) via a data path. The method comprises: by each peer, using input keying material to independently generate equivalent pairs of peer encryption keys (PEKs), the pair generated by the 1st peer comprises a transmission PEK Tx1 and a reception PEK Rx1 and the pair generated by the 2nd peer comprises a transmission PEK Tx2=Rx1 and a reception PEK Rx2=Tx1; verifying equivalence of the PEK pairs generated by the 1st peer and the 2nd peer; and using, by the 1st peer and the 2nd peer, the verified PEK pairs to become in possession of equivalent pairs of session encryption keys (SEKs).

The verifying comprises: generating a first handshake (HS) message encrypted by the transmission PEK Tx1 and sending the first HS message to the 2nd peer via the data path; by the 2nd peer, decrypting the first HS message using the reception PEK Rx2, upon successful decryption generating a second HS message encrypted by the transmission PEK Tx2, and sending the second HS message to the 1st peer via the data path; and decrypting the second HS message by the 1st peer using reception PEK Rx1, wherein a successful decryption of the second HS message confirms the equivalence of the PEK pairs.

By way of non-limiting example, the input keying material can comprise at least one of: keys generated by Diffie-Hellman method, keys generated by post-quantum key exchange method, and keys generated by quantum key distribution method. In accordance with further aspects and, optionally, in combination with other aspects of the presently disclosed subject matter, the input keying material can be hybrid and can comprise two or more keying materials received, independently by each peer, from two or more sources of keying material (SKMs). At least two keying materials comprised in the hybrid input material can be received with different frequencies defined by a rollover policy. Each peer can generate the respective PEK pair responsive to receiving an update of the input keying material (or otherwise, depending on rollover policy).

In accordance with further aspects and, optionally, in combination with other aspects of the presently disclosed subject matter, each HS message can comprise an encrypted payload and data informative of encapsulation overhead corresponding to a communication protocol implemented for communicating data packets via the data path (e.g. MACsec, IPsec, WireGuard, etc.). Each HS messages can bear a special mark making the HS message distinguishable within a traffic flow via the data path. Generating a HS message can comprise: generating, by a respective peer, a random content; encrypting the generated random content; and inserting the encrypted random content into a payload of the HS message.

In accordance with further aspects and, optionally, in combination with other aspects of the presently disclosed subject matter, the values of keys in the SEK pairs can be equal to the values of respective keys in the PEK pairs. Alternatively, the values of keys in PEK pairs can be used as keying material for further deriving, by the peers, values of respective keys in SEK pairs with the help of a preconfigured key derivation function. Optionally, random content generated by the peers when generating respective HS messages can be used as a salt input when deriving the values of SEK keys. By way of non-limiting example, when in each PEK pair a value of the transmission key is equal to a value of the reception key, the generated random content can be used as a salt input to derive different values of SEK keys in the SEK pairs.

In accordance with other aspects of the presently disclosed subject matter, there is provided a computing system comprising a first peering computer (1st peer) and a second peering computer (2nd peer) configured to communicate via a data path, the system configured to operate in accordance with the method above.

Among advantages of certain embodiments of the presently disclosed subject matter is enabling increased security due to the simplified protocol stack and/or capability of establishing encryption keys based on a hybrid input keying material. Among further advantages of certain embodiments of the presently disclosed subject matter is enabling seamless rollover of the encryption keys.

BRIEF DESCRIPTION OF THE DRAWINGS

In order to understand the invention and to see how it can be carried out in practice, embodiments will be described, by way of non-limiting examples, with reference to the accompanying drawings, in which:

FIGS. 4a-4c illustrate non-limiting examples of the internal structure of HS messages adapted for different communication protocols.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "sending", "receiving", "encrypting", "generating", "using" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities.

The terms "non-transitory memory" and "non-transitory storage medium" used herein should be expansively construed to cover any volatile or non-volatile computer memory suitable to the presently disclosed subject matter.

The operations in accordance with the teachings herein may be performed by a computer specially constructed for the desired purposes or by a general-purpose computer specially configured for the desired purpose by a computer program stored in a computer readable storage medium.

Embodiments of the presently disclosed subject matter are not described with reference to any particular programming language. It will be appreciated that a variety of programming languages may be used to implement the teachings of the presently disclosed subject matter as described herein.

Figure 1:
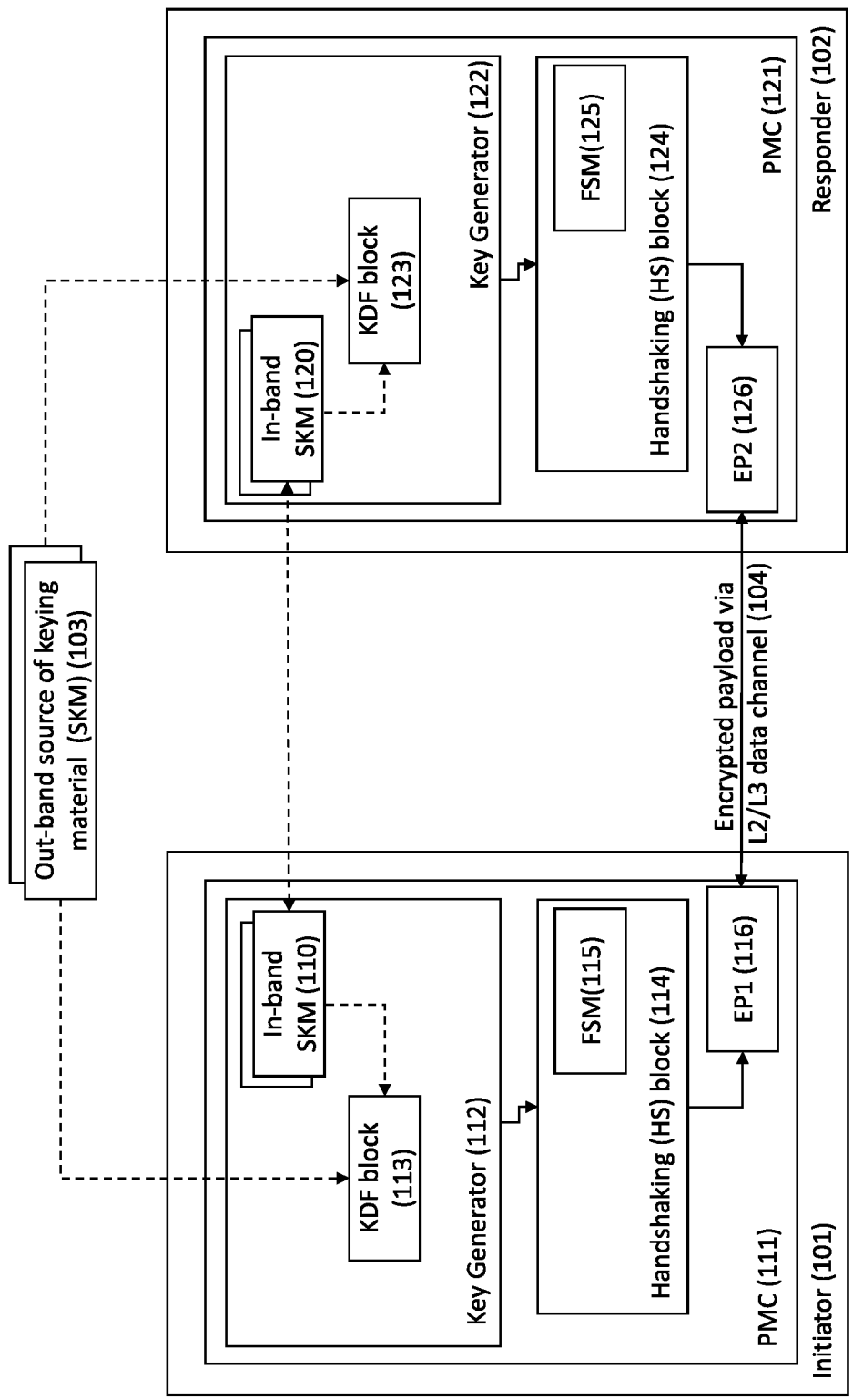
FIG. 1 illustrates generalized block diagrams of peering computers configured in accordance with certain embodiments of the presently disclosed subject matter.

Bearing this in mind, attention is drawn to FIG. 1 schematically illustrating two computers configured to communicate therebetween in accordance with the presently disclosed subject matter. For purpose of a rollover of the encryption keys, a computer 101 is pre-configured to operate as a handshake initiator (referred to hereinafter also as "initiator" or "$1^{st}$ peer") and a computer 102 is configured to operate as a handshake responder referred to hereinafter also as "responder" or "$2^{nd}$ peer").

Initiator 101 comprises a processing and memory circuitry (PMC) 111 comprising a processor (not shown for simplicity of illustration) operatively connected to a memory (not shown for simplicity of illustration). PMC 111 can be configured to execute several functional blocks in accordance with computer-readable instructions implemented on a non-transitory computer-readable storage medium. Such functional blocks are referred to hereinafter as comprised in the PMC. As will be further detailed with reference to FIGS. 2-4c, PMC 111 comprises a key generating block 112 operatively connected to a handshaking (HS) block 114. HS block 114 is further operatively connected to a communication endpoint (EP) 116. Optionally, one or more functional blocks can be implemented with the help of ASIC or FPGA.

Likewise, responder 102 comprises a processing and memory circuitry (PMC) 121 with operatively connected key generating block 122, HS block 122 and endpoint 126.

Each of key generators 112 and 122 is configured to obtain input keying material, and use it to independently generate a pair of transmission (Tx) and reception (Rx) peer encryption keys (PEKs). In accordance with certain embodiments of the presently disclosed subject matter, the generated pairs of PEKs are equivalent, i.e. have equal values of corresponding PEKs. It is noted that, optionally, the key generators 112 and 122 can be configured to generate PEK pairs with each pair having Rx PEK equal to Tx PEK. Thus such a single value PEK pair can comprise only a single value representing, both, PEK usable for transmitting, and PEK usable for receiving.

Unless specifically stated otherwise, it is appreciated that throughout the specification a key pair {Tx1; Rx1} belonging to a $1^{st}$ peer and a key pair {Tx2; Rx2} belonging to a $2^{nd}$ peer are referred to as equivalent key pairs when Tx1 has the same value as Rx2 and Rx1 has the same value as Tx2.

Each of key generators 112 and 121 comprises a respective KDF (Key Derivation Function) block (113, 123) operatively connected to in-band and/or out-band source(s) (SKM) (103, 113, 123) of keying material.

The term "keying material" should be expansively construed to cover any kind of data (e.g. keys, secret initialization vectors and/or parts thereof, other secret parameters, etc.) usable for establishing and maintaining cryptographic keying relationships.

Each KDF block (113, 123) is configured to receive keying material from a single or multiple SKMs thereby obtaining an input keying material. Each KDF block (113, 123) is further configured to use the input keying material to derive a pair of PEKs with the help of a special set of mathematical operations referred to hereinafter as key derivation function (KDF). Unless specifically stated otherwise, it is appreciated that throughout the specification the term "input keying material" relates to keying material usable for deriving respective encryption keys and comprising the most updated data received by a peer from the respective one or more SKMs.

Figure 1A:
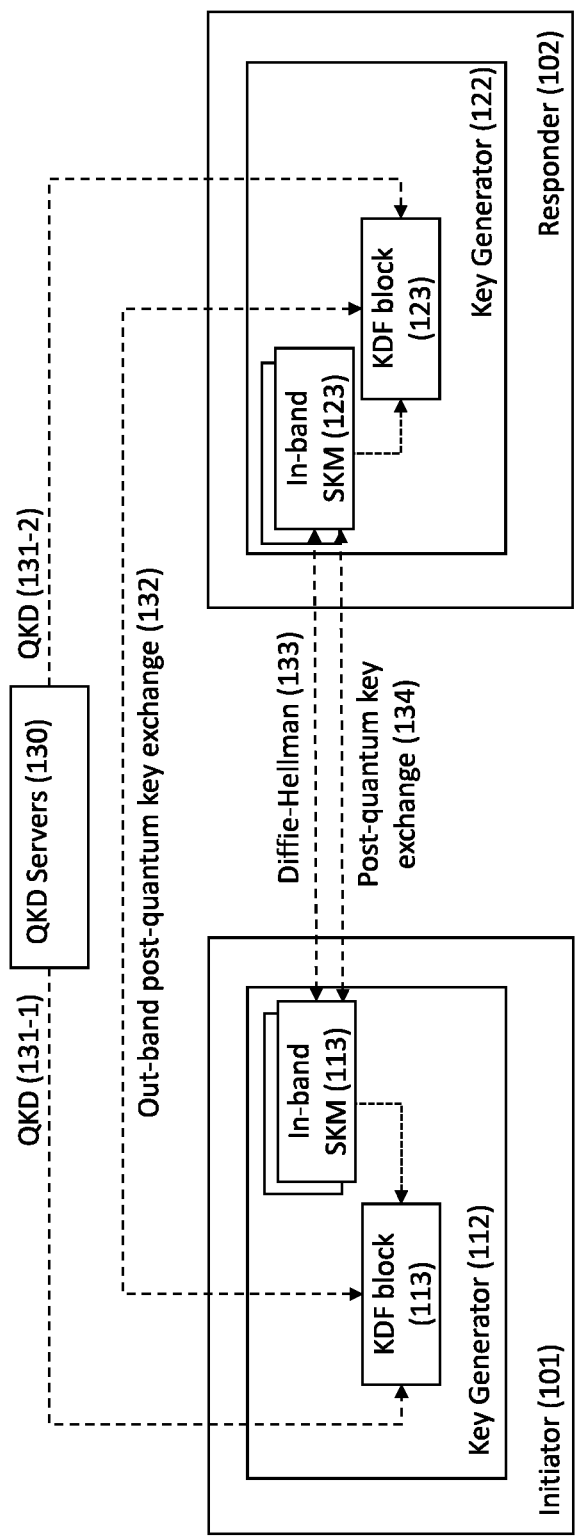
FIGS. 1a-1b illustrate non-limiting examples of different keying material and sources thereof in accordance with certain embodiments of the presently disclosed subject matter.

Non-limiting examples of SKMs and different keying material are illustrated in FIG. 1a. Keying material can be received out-band (e.g. from a QKD (Quantum Key Distribution) server 130, as a result of post-quantum key exchange 132, etc.). Alternatively or additionally, keying material can be received as a result of in-band key exchange (e.g. Diffie-Hellman key exchange 133, in-band post-quantum key exchange 134, etc.).

KDF block 113 receives the same input keying material, and implements the same key derivation function (KDF) as KDF block 123.

KDF blocks can be configured to receive keying material in push and/or pull mode and to generate the PEK pairs responsive to events defined by a policy of key rollover. By way of non-limiting example, KDF blocks can be configured to generate PEK pairs responsive to any received update of input keying material.

It is noted that keying materials from different SKMs can be received at different points-in-time. Furthermore, optionally, a keying material received from a single source also can comprise multiple secrets optionally received at different point-in-time. By way of non-limiting example, a policy of key rollover can be configured to update DH (Diffie-Hellman) keys every few minutes, while updating quantum keys (QK) only once a day.

Figure 1B:
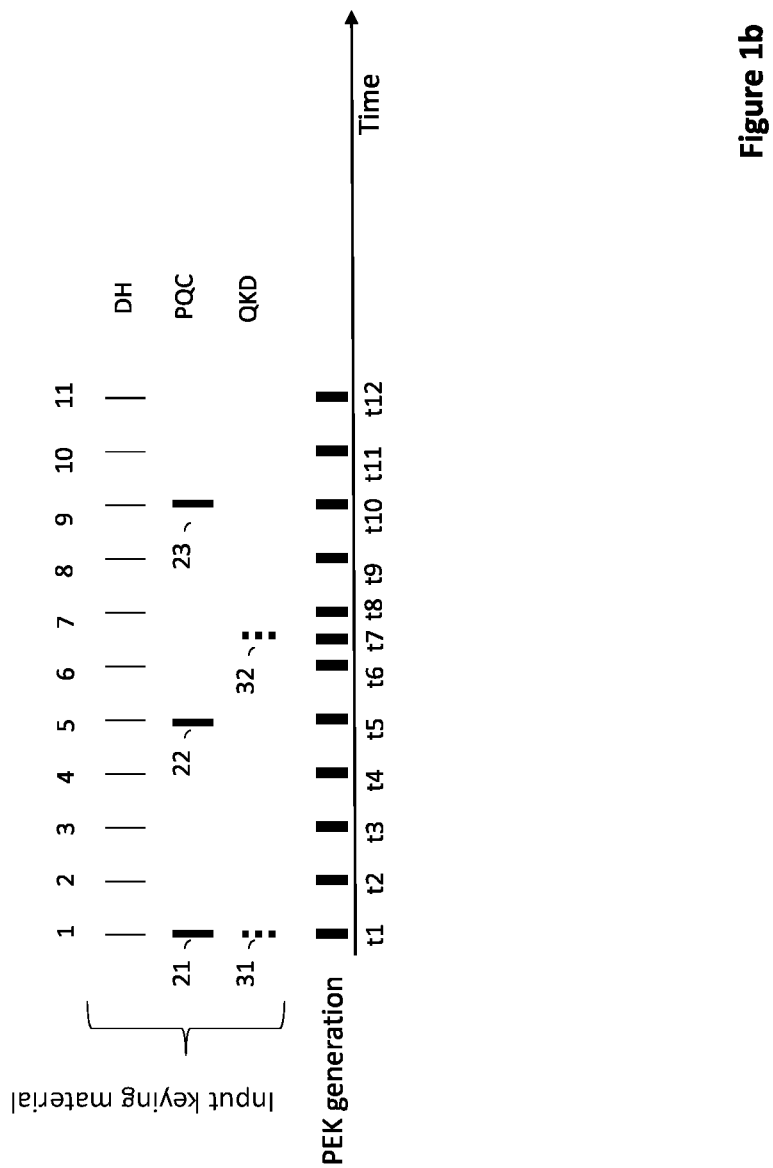

Referring to FIG. 1b, there is illustrated a non-limiting schematic example of PEK's generation in accordance with certain embodiments of the presently disclosed subject matter. The illustrated input keying material is hybrid and comprises DH keys (1-11), post-quantum keys (21-24) and quantum keys (31-32) received from multiple SKMs and with different frequencies defined by an exemplified rollover policy. For illustration, KDF block generates a PEK pair responsive to every received update of the input keying material. In the illustrated example, PEK generation at points-in-time t1-t6 and t8-t12 correspond to receiving new DH keys (and PQ keys at points-in-time t1, t5 and t10), and PEK generation at point-in-time t7 corresponds to non-scheduled receiving of quantum key (e.g. due to vulnerability reported by the computer to QKD server 130). The exemplified input keying material used for PEK generation is illustrated in Table 1.

TABLE 1

Exemplified updated keying material used for PEK generation

| Point-in-time | Most updated DH keying material received by the peer | Most updated PQC keying material received by the peer | Most updated QK keying material received by the peer | Hybrid input keying material used for PEK generation |
|---|---|---|---|---|
| t1 | 1 | 21 | 31 | {1, 21, 31} |
| t2 | 2 | 21 | 31 | {2, 21, 31} |
| ... | ... | ... | ... | ... |
| t5 | 5 | 22 | 31 | {5, 22, 31} |
| t6 | 6 | 22 | 31 | {6, 22, 31} |
| t7 | 6 | 22 | 32 | {6, 22, 32} |
| t8 | 7 | 22 | 32 | {7, 22, 32} |
| ... | ... | ... | ... | ... |
| t10 | 9 | 23 | 32 | {8, 23, 32} |
| ... | ... | ... | ... | ... |

By way of non-limiting example, KDF block can generate PEK pairs with the help of HKDF (HMAC-based Extract-and-Expand Key Derivation Function) capable of handling hybrid input keying material (e.g. as disclosed in NIST document SP 800-56C, "Recommendation for Key-Derivation Methods in Key-Establishment Schemes", Mar. 20, 2020).

Referring back to FIG. 1, each KDF block (113, 123) is further configured to transfer the generated PEK pair to respective HS block (114, 124). As will be further detailed with reference to FIGS. 2-4c, HS blocks (114, 124) are configured to run a handshake (HS) process enabling establishment of session keys for further encrypted communication of traffic data packets. Each HS block comprises an FSM (Finite State Machine) block (115, 125) operating in accordance with events of the HS process. HS blocks are configured to communicate HS messages via L2/L3 data channel 104 with the help of the end points (116, 126).

Upon successful completion of the HS process, each HS block (114, 124) informs respective end point (116, 126) with regard to establishing a pair of Tx/Rx session encryption keys (referred to hereinafter also as "session keys" and/or SEKs). End points (116, 126) are further configured to use the established session keys for encrypting/decrypting the payload of traffic packets and to enable secured communication via data channel 104 therebetween. It is noted that end points (116, 126) can be configured to enable encapsulation of HS messages and traffic data packets as required by an implemented security protocol (e.g. MACsec, IPsec, WireGuard, etc.).

MACsec is a Layer-2 security solution that is standardized in IEEE 802.1AE. A MACsec packet is constructed by adding SecTAG (Security Tag) and ICV (Integrity Check Value) to an Ethernet frame. SecTAG contains information that identifies the protocol, the cipher suites, as well as a packet number for replay protection. ICV is calculated by GMAC (Galois Message Authentication Code) to ensure the integrity of the MAC destination address, the MAC source address, SecTAG, and the encrypted payload. A payload can be encrypted by AES (Advance Encryption Standard) cipher suite, either a 128-bit or a 256-bit key, depending on the configuration.

Most commonly in the prior art, cryptographic keys for MACsec operation are established and updated with the help of MKA protocol. MKA (MACsec Key Agreement) is a standard protocol defined in IEEE 802.1X-2010 and operating as a control plane for MACsec. MKA is based on a hierarchical key derivation structure enabling deriving SAK (Secure Association Key) from a master key. Master key is distributed during the authentication process provided in accordance with IEEE 802.1x protocol. SAK is a session key that is used in MKA to encrypt an Ethernet payload by a symmetric-key encryption algorithm of MACsec. The process of MKA-based cryptographic key establishment is further detailed, for example, in the article "Post-quantum MACsec Key Agreement for Ethernet Networks" by Joo Yeon Cho and Andrew Sergeev, 15th International Conference on Availability, Reliability and Security (ARES 2020), August 25-28, 2020, Virtual Event, https://doi.org/10.1145/3407023.3409220.

IPsec (Internet Protocol Security), a set of protocols defined by the Internet Engineering Task force, provides a security mechanism at the IP layer. IPsec processing involves encapsulation of outgoing packets and de-encapsulation of inbound packets. The so-called "Encapsulating Security Payload" (ESP) (e.g. defined in IETF, RFC 4303) protocol provides confidentiality, data integrity, and data source authentication of IP packets. This requires the insertion of an ESP header after the IP header of an IP packet but in front of the data to be protected. An ESP trailer is appended after the data to be protected. An ESP packet is identified by the protocol field in the IP header. In order to allow IPsec packets to be properly encapsulated and de-encapsulated, it is necessary to associate security services and a key between the traffic being transmitted and the remote node that is the intended recipient of the traffic.

IKE (Internet Key Exchange) is the key negotiation and management protocol (e.g. defined in IETF, RFC 5996) that is most commonly used in the prior art to provide dynamically negotiated and updated cryptographic keys for IPsec. IKE serves as a control plane for IPsec and enables VPN peers to independently produce the same symmetrical key pairs. These key pairs then encrypt and decrypt the regular IP packets used in the bulk transfer of data between VPN peers. IKE builds the VPN tunnel by authenticating both sides and reaching an agreement on methods of encryption and integrity. The outcome of an IKE negotiation is a Security Association (SA). A SA is a relationship between two or more nodes that describes how the nodes will use security services to communicate securely.

It is noted that the teachings of the presently disclosed subject matter are not bound by embodiments described with reference to FIG. 1, FIG. 1a and FIG. 1b. Equivalent and/or modified functionality can be consolidated or divided in another manner and can be implemented in any appropriate combination of software with firmware and/or hardware and executed on a suitable computer.

Figure 2:
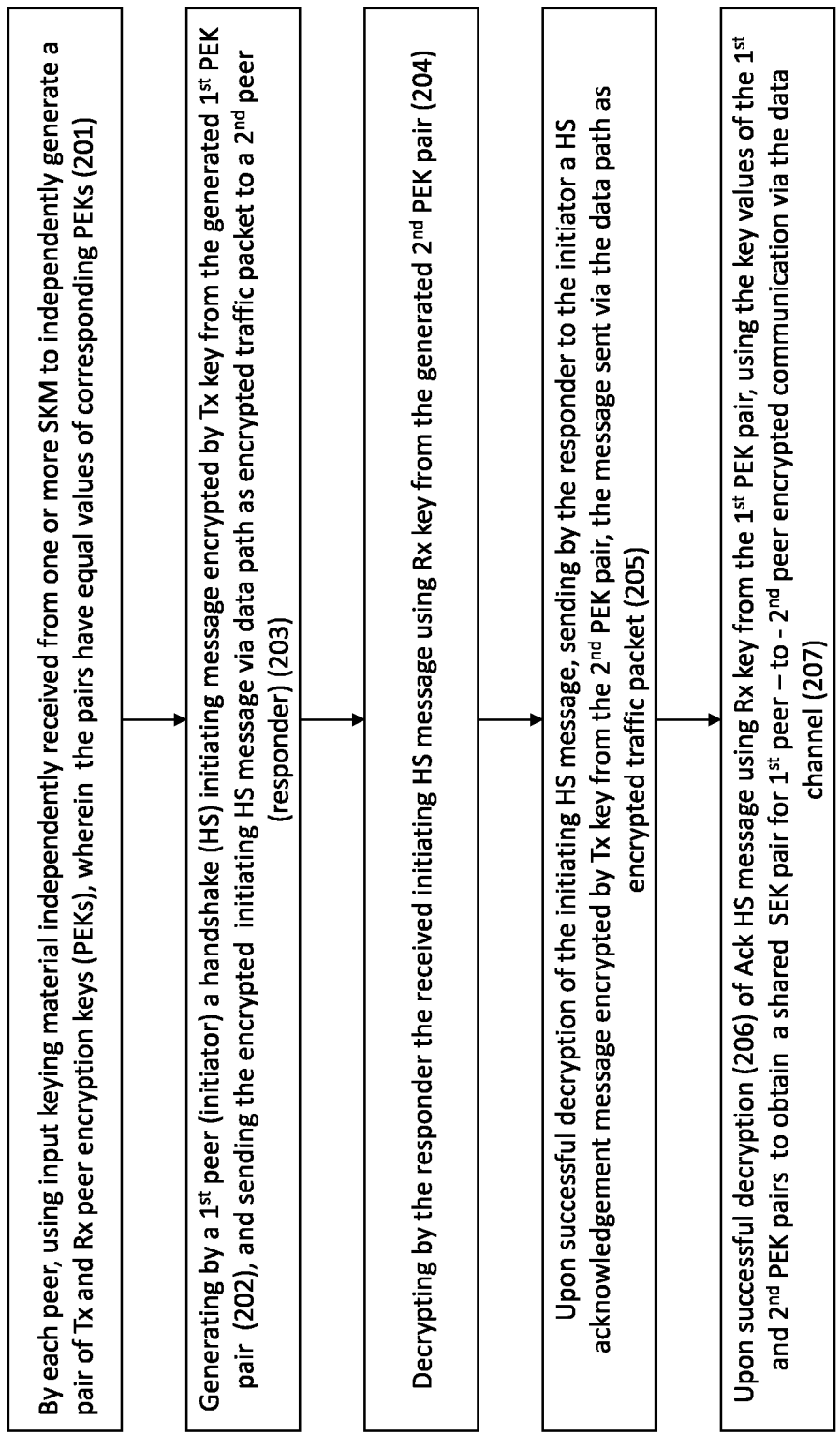
FIG. 2 illustrates a generalized flow chart of encryption keys' rollover in accordance with certain embodiments of the presently disclosed subject matter.

Referring to FIG. 2, there is illustrated a generalized flow chart of encryption keys' rollover in accordance with certain embodiments of the presently disclosed subject matter. As was detailed with reference to FIGS. 1, 1a and 1b, each peer uses equal input keying material independently received from one or more SKM to independently generate (201) a pair of Tx and Rx peer encryption keys (PEKs), wherein the pairs are equivalent (i.e. Tx PEK of the initiator has the same value as Rx PEK of the responder and Rx of the initiator has the same value as Tx of the responder). Generating a new PEK pair can be provided in accordance with a key rollover policy (e.g. responsive to updating input keying material received from any SKM, responsive to updating input keying material received from certain one or more SKMs, etc.)

Upon generating the $1^{st}$ PEK pair, the $1^{st}$ peer (HS initiator 101) generates (202) a handshake (HS) message encrypted by Tx key from the generated $1^{st}$ PEK pair. Initiator 101 sends (203) the encrypted HS message, via data path as a part of the data flow, to a $2^{nd}$ peer (HS responder 102), thereby initiating a HS process.

It is noted that throughout the specification the terms "$1^{st}$ PEK pair", "$2^{nd}$ PEK pair", "1st SEK pair", $2^{nd}$ SEK pair and the terms derived therefrom are indicative of belonging the keys to the respective $1^{st}$ and $2^{nd}$ peers and are not indicative of a sequential relationship between the PEK pairs, SEK pairs and/or keys therein.

The $2^{nd}$ peer (HS responder 102) receives the encrypted initiating HS message and decrypts (204) it using Rx key from the $2^{nd}$ PEK pair which it has generated. Upon successful decryption of the initiating HS message, the responder sends (205) to the initiator a HS acknowledgement (Ack) message encrypted by Tx key from the $2^{nd}$ PEK pair, the message sent via the data path as a part of a traffic flow.

As the HS messages are sent within the traffic flow, in accordance with certain embodiments of the presently disclosed subject matter and as will be further detailed with reference to FIGS. 3 and 4, the HS messages are configured to bear special marks indicative that the respective data packet shall be handled as an HS message.

Initiator 101 receives the encrypted acknowledgement HS message and decrypts (206) it using Rx key from the $1^{st}$ PEK pair. Successful decryption of Ack HS message by initiator 101 proves the correspondence of PEK keys in the $1^{st}$ PEK pair and the $2^{nd}$ PEK pair, thereby completing the handshake process. As a result, initiator 101 and responder 102 can use the verified equivalence of PEK pairs to become in possession of equivalent pairs of session encryption keys (SEK pair).

By way of non-limiting example, the values of session encryption keys (SEKs) in the equivalent SEK pair can be equal to the PEKs values in the equivalent $1^{st}$ and $2^{nd}$ PEK pairs. Namely:

Tx SEC of $1^{st}$ peer=Rx SEC of $2^{nd}$ peer=Tx PEK of $1^{st}$ PEK pair=Rx PEK of $2^{nd}$ PEK pair; and Rx SEC of $1^{st}$ peer=Tx SEC of $2^{nd}$ peer=Rx PEK of $1^{st}$ PEK pair=Tx PEK of $2^{nd}$ PEK pair.

It is noted that, optionally, Rx SEK can be equal to Tx SEK (e.g. when PEK pairs are generated with Rx PEK equal to Tx PEK).

By way of another non-limiting example, initiator 101 and responder 102 can derive the values of session encryption keys for the equivalent SEK pairs from the PEK values in the equivalent $1^{st}$ and $2^{nd}$ PEK pairs with the help of a preconfigured key derivation function.

Furthermore, completing the handshake process not only proves the correspondence of PEK keys in the $1^{st}$ PEK pair and the $2^{nd}$ PEK pair (i.e. pairs' equivalence), but also provides the $1^{st}$ peer and the $2^{nd}$ peer with the knowledge of trusted content comprised in the HS messages. This trusted content (e.g. random numbers respectively generated by initiator 101 and responder 102) can be used as an additional input (salt input) when generating the SEKs. By way of non-limiting example, such salt input can be usable to generate Tx SEK different from Rx SEK in a case of single value PEK pairs.

Being in possession of the equivalent SEK pairs, initiator 101 and responder 102 can use (207) the respective SEK values for $1^{st}$ peer-to-$2^{nd}$ peer encrypted communication via the data channel 104.

Thus, the embodiments detailed with reference to FIG. 2 enable encrypting and encapsulating the traffic packets as required by a suitable security protocol with no need of involving a control plane for establishing the cryptographic keys and rollover thereof.

Figure 3:
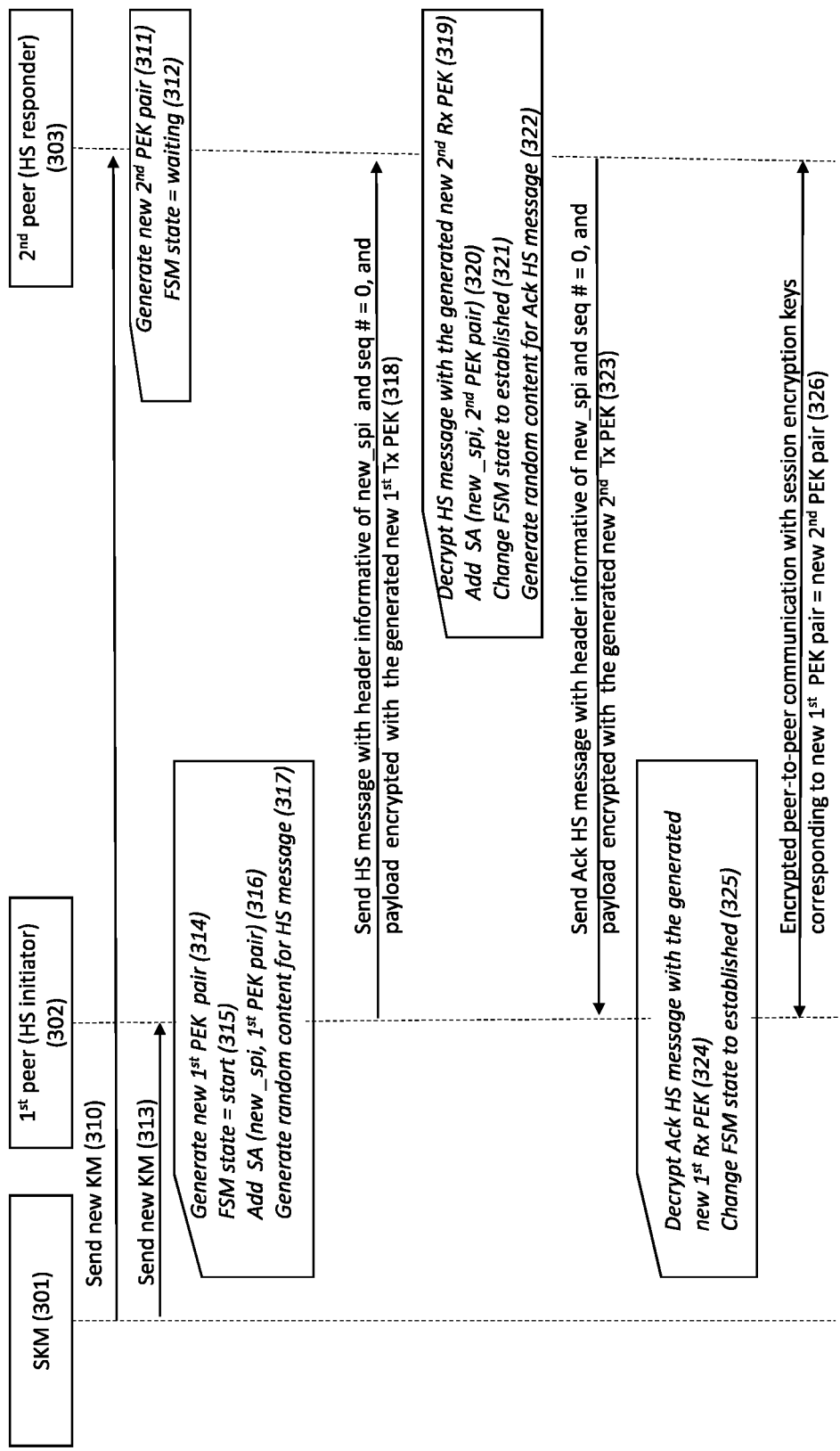
FIG. 3 illustrates a ladder diagram of a non-limiting example of a successful handshake (HS) process in accordance with certain embodiments of the presently disclosed subject matter.

Referring to FIG. 3, there is illustrated a ladder diagram of a non-limiting example of the successful HS process in accordance with certain embodiments of the presently disclosed subject matter.

SKM 301 sends (310, 313) the same new keying material to HS responder 303 and HS initiator 302. Preferably, SKM 301 sends, firstly, the new keying material to responder 303 and then to initiator 302, thereby providing responder 303 with additional time for generating the $2^{nd}$ PEK pair prior to receiving an HS message from initiator 302 (thereby reducing unnecessary re-transmissions during the HS process).

For purpose of illustration only, the following description is provided for a case of receiving the new secrets for the input keying material from a single SKM and generating PEK pairs responsive to receiving such an update. Those skilled in the art will readily appreciate that the teachings of the presently disclosed subject matter are, likewise, applicable to hybrid input keying material and for another policy of keys' rollover (by way of non-limiting example, as detailed above with reference to FIGS. 1a and 1b).

In response to receiving the new keying material, responder 303 (e.g. key generator 122) uses the updated input keying material to generate (311) a new $2^{nd}$ PEK pair comprising new $2^{nd}$ Tx PEK and $2^{nd}$ Rx PEK, and configures (312) the state of FSM 125 as "HS waiting".

In response to receiving the new keying material, initiator 302 uses the updated input keying material to generate (314) a new $1^{st}$ PEK pair comprising new $1^{st}$ Tx PEK and $1^{st}$ Rx PEK, and configures (315) the state of FSM 115 as "HS start". Further, initiator 302 generates (316) and stores a new record (referred to hereinafter as "security association" or SA record), informative of the new $1^{st}$ pair of PEKs. The SA record is associated with a new security parameter index (new_SPI) to be shared between the initiator 302 and responder 303 during the initiated HS process. It is noted that, optionally, instead of a common message for the new pair of PEKs, initiator 302 can generate separate SA records for the new Tx PEK and the new Rx PEK, each record associated with the same new_SPI.

Initiator 302 also generates (317) a random content for the HS message to be sent to responder 303 (preferably, the size of the generated random content exceeds the size of PEKs).

Initiator 302 encrypts the generated content with the new $1^{st}$ Tx PEK and sends (318) the HS message to responder 303 to initiate the HS process. The header of the initiating HS message is configured to be informative of new_SPI and to be indicative that the respective encrypted packet shall be handled as an HS message. By way of non-limiting example, the header can bear information that the sequence number (seq #) of the data packet transmitted from the $1^{st}$ peer is equal to zero (or other suitable pre-configured number).

The internal structure of HS messages is further detailed with reference to FIGS. 4a-4c.

Responder 303 uses the new $2^{nd}$ Rx PEK to decrypt (319) the received initiating HS message, generates (320) and stores a new SA record informative of the new $2^{st}$ pair of PEKs and the shared new security parameter index (new_SPI), and changes (321) the state of FSM 125 to "HS established".

It is noted that the teachings of the presently disclosed subject matter are not bound by initiator-driven index allocation as detailed above. Alternatively, responder's SPI can be generated by responder itself. In such a case, responder 303 can learn initiator's SPI upon receiving the initiating HS message and initiator 302 can learn responder's SPI from the acknowledgement HS message.

Responder 303 further generates (322) a random content for HS message to be sent to initiator 302, encrypts the generated content with the new $2^{nd}$ Tx PEK and sends (323) the generated HS message to responder 303 to acknowledge successful decryption of the initiating message. The header of the acknowledgement HS message is configured to be informative of new_SPI and to be indicative that the respective encrypted packet shall be handled as an HS message (e.g. the sequence number of the data packet transmitted from the $2^{nd}$ peer is equal to zero or other suitable pre-configured number).

Initiator 302 uses the new $1^{st}$ Rx PEK to decrypt (324) the received acknowledgement HS message and changes (325) the state of FSM 115 to "HS established".

Thus, the above process verifies that the both peers are in possession of equivalent PEK pairs, these pairs are usable for obtaining equivalent SEK pairs for encrypted communication between the $1^{st}$ and the $2^{nd}$ peers.

Figure 4A:
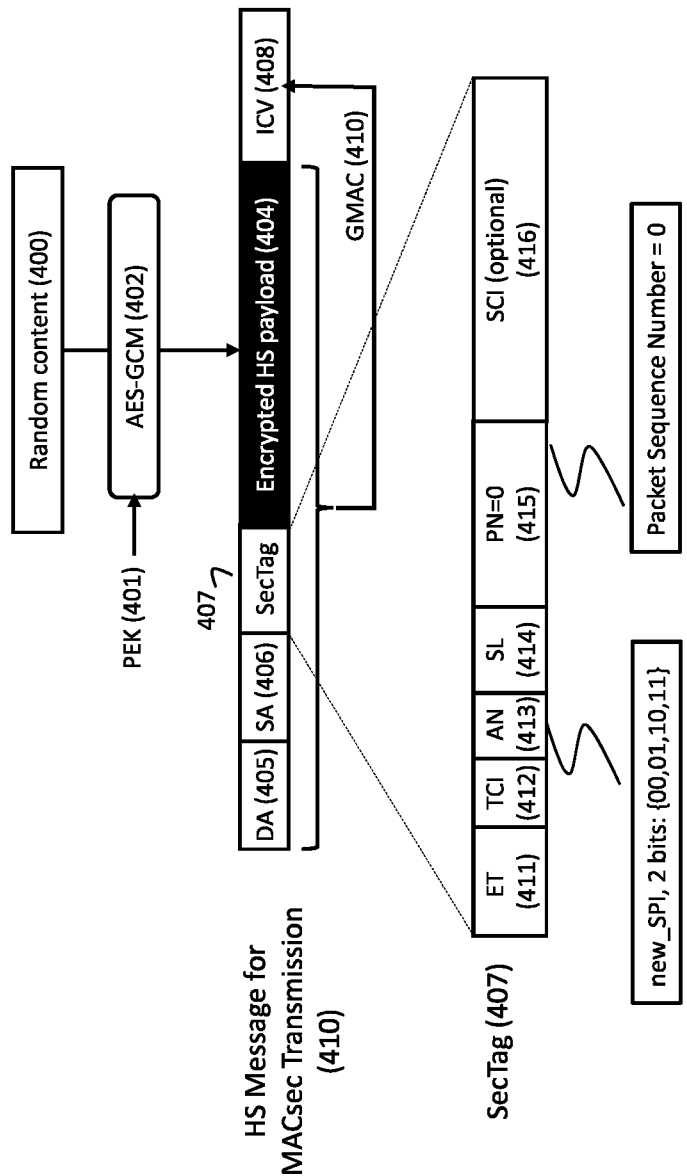
Figure 4C:
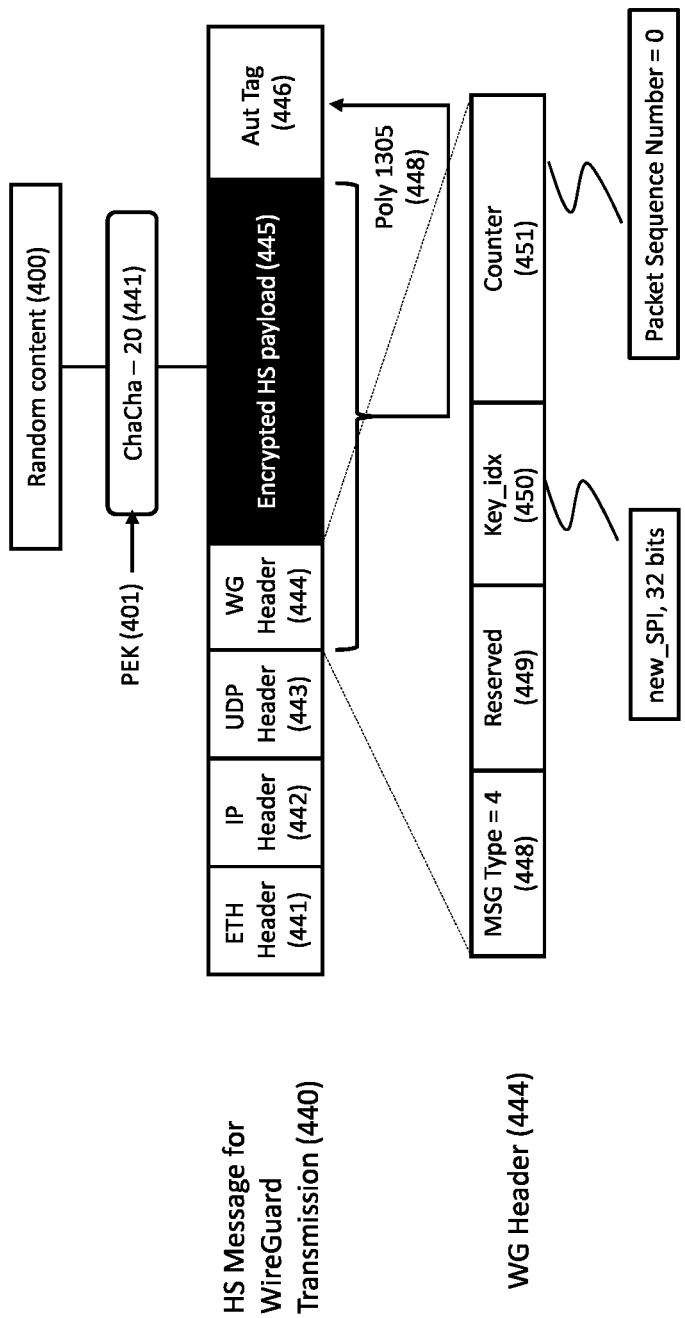

Referring to FIGS. 4a-4c, there are illustrated non-limiting examples of the internal structure of HS messages adapted for different communication protocols.

In accordance with certain embodiments of the presently disclosed subject matter, the structure of HS message 410 illustrated in FIG. 4a is adapted (e.g. by end point 116 or 126) for MACsec transmission. The random content 400 (e.g. generated by HS block 114 or 124) is further encrypted by applying AES-GCM (Advance Encryption Standard-Galois Counter Mode) encryption algorithm 402 using the respective Tx PEK 401. Encrypted payload 404 of the generated HS message comprises the resulted encrypted content. The header of HS message comprises Destination Address 405, Source Address 406 and Security Tag (SecTag)

407. The HS message further comprises Integrity Check Value (ICV) 408. ICV 408 is usable for verifying data integrity and authenticity of a message and is calculated by applying GMAC (Galois Message Authentication Code) over MAC destination address, MAC source address, SecTAG, and the encrypted payload. SecTag 407 can comprise the following standard fields:

| Field | Size | Description |
| --- | --- | --- |
| ET (411) | 16 bit | MACsec EtherType value for MACsec packet |
| TCI (412) | 6 bit | Tag control information indicative of how frame is protected |
| AN (413) | 2 bit | Association number |
| SL (414) | 8 bit | Short length of MAC service data unit (MSDU) |
| PN (415) | 32 bit | Packet sequence number |
| SCI (416) (optional) | 64 bit | Secure channel identifier |

In accordance with certain embodiments, AN 413 field of HS message can be informative of new_SPI corresponding to the respective HS message. Field PN 415 of all HS messages can be configured to be equal to zero (thereby distinguishing HS messages from regular traffic packets). By way of an alternative example, instead of using the PN field, HS messages can be distinctively indicated using one or more reserved bits in TCI or SCI fields.

The structure of HS message 420 illustrated in FIG. 4b is adapted for IPSec transmission (tunnel mode). The random content 400 of HS message is encrypted by applying AES-GCM encryption algorithm 402 using the respective Tx PEK 401. Payload 425 of the generated HS message comprises the resulted encrypted content. The HS message comprises Ethernet Header 421, IP Header 422, ESP (IP Encapsulating Security Payload) 423 and Initialization Vector (IV) 424. HS message 420 further comprises Integrity Check Value (ICV) 426. ICV is usable for verifying the data integrity and the authenticity of a message and is calculated by applying GMAC over ESP, IV and the encrypted HS payload. ESP 423 can comprise field 429 informative of SPI (new_SPI), and field 430 informative of Packet Sequence Number (seq #=0). IV 424 can be equal to Packet Sequence Number (seq #=0).

The structure of HS message 440 illustrated in FIG. 4c is adapted for WireGuard (WG) transmission. WG protocol is detailed, for example, in the technical paper "WireGuard: Next Generation Kernel Network Tunnel" by Jason A. Donenfeld, Proceedings of the Network and Distributed System Security Symposium, NDSS 2017, https://www.wireguard.com/papers/wireguard.pdf.

The random content 400 of HS message is encrypted by applying ChaCha-20 encryption algorithm 441 using the respective Tx PEK 401. Payload 445 of the generated HS message comprises the resulted encrypted content. The header of HS message comprises Ethernet Header 441, IP Header 442, UDP Header 443 and WireGuard Header 444. The generated HS message further comprises Authentication Tag 446. Authentication Tag 446 is usable for verifying the data integrity and the authenticity of a message and is calculated by applying cryptographic message authentication code Poly1305 over WG Headers and encrypted payload. WG Header 444 comprises the following fields: Message Type 448, Reserved Field 449, Key Index 450 and Counter 451. Key Index Field 450 is configured to bear information of new_SPI.

Most commonly in the prior art, WireGuard is implemented with the following type of messages: cryptographic key establishing messages (MESSAGE_HANDSHAKE_INITIATION, message type=1; MESSAGE_HANDSHAKE_RESPONSE, message type=2; MESSAGE_HANDSHAKE_COOKIE, message type=3) and traffic data packets (MESSAGE_DATA, message type=4). In accordance with certain embodiments of the presently disclosed subject matter, HS message 440 can be transmitted within the traffic flow with MSG Type Field 448 indicative of message type=4. In such a case, HS message 440 can be distinguished from regular traffic packets by configuring Packet Sequence Number in Counter 451 to be equal to zero. By way of an alternative example, instead of using Counter 451, HS messages can be distinctively indicated using one or more reserved bits in Reserved Field 449.

It is noted that, further to the encrypted random content 400 and depending on the engineering solution, encrypted payload (404, 425 or 445) can comprise padding or other data.

It is further noted that the teachings of the presently disclosed subject matter are not bound by embodiments described with reference to FIG. 4a-4c. Equivalent and/or modified functionality can be implemented in other types of encapsulation and with other suitable message structures.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of establishing encryption keys for communicating between a first peering computer (1st peer) and a second peering computer (2nd peer) via a data path, the method comprising:
   a. by each peer, using input keying material to generate a pair of peer encryption keys (PEKs), a PEK pair generated by the 1st peer comprises a transmission PEK Tx1 and a reception PEK Rx1 and a PEK pair independently generated by the 2nd peer comprises a transmission PEK Tx2 and a reception PEK Rx2, wherein each peer receives a respective input keying material and generates a respective PEK pair independently from another peer;
   b. running a handshake (HS) process to verify that both peers are in possession of equivalent PEK pairs generated prior and independently of HS process, the HS process comprising:
      i. by the 1st peer, generating a first handshake (HS) message encrypted by the transmission PEK Tx1 and sending the first HS message to the 2nd peer via the data path, thereby initiating the HS process;
      ii. by the 2nd peer, decrypting the first HS message using the reception PEK Rx2, upon successful decryption generating a second HS message encrypted by the transmission PEK Tx2, and sending the second HS message to the 1st peer, wherein the 2nd peer sends the second HS message via the data path;
      iii. by the 1st peer, decrypting the second HS message using the reception PEK Rx1, wherein a successful decryption of the second HS message confirms the successful completion of the HS process; and
   c. upon successful completion of the HS process, using by the 1st peer and the 2nd peer said PEK pairs to become in possession of equivalent pairs of session encryption keys (SEKs).

2. The method of claim 1, wherein the input keying material comprises at least one of: keys generated by Diffie-Hellman method, keys generated by post-quantum key exchange method, and keys generated by quantum key distribution method.

3. The method of claim 1, wherein the input keying material is hybrid and comprises two or more keying materials received, independently by each peer, from two or more sources of keying material (SKMs).

4. The method of claim 3, wherein at least two keying materials comprised in the hybrid input material are received with different frequencies defined by a rollover policy.

5. The method of claim 1, wherein each peer generates the respective PEK pair responsive to receiving an update of the input keying material.

6. The method of claim 1, wherein each HS message comprises an encrypted payload and data informative of encapsulation overhead corresponding to a communication protocol implemented for communicating data packets via the data path.

7. The method of claim 1, wherein each HS messages bears a special mark making the HS message distinguishable within a traffic flow via the data path.

8. The method of claim 1, wherein generating a HS message comprises: generating, by a respective peer, a random content; encrypting the generated random content; and inserting the encrypted random content into a payload of the HS message.

9. The method of claim 1, wherein the keys' values in the SEK pairs are equal to respective keys' values in the PEK pairs.

10. The method of claim 1, wherein the values of keys in PEK pairs are used as keying material for further deriving, by the peers, values of respective keys in SEK pairs with the help of a preconfigured key derivation function.

11. The method of claim 10, wherein generating a HS message comprises generating, by a respective peer, a random content, the method further comprising using the generated random content as a salt input when deriving the values of SEK keys.

12. The method of claim 11, wherein, in each PEK pair, a value of transmission key is equal to a value of reception key, and wherein the generated random content is used to derive different values of SEK keys in SEK pairs.

13. A computing system comprising a first peering computer (1st peer) and a second peering computer (2nd peer) configured to communicate via a data path, wherein each peer is configured to use input keying material to generate a pairs of peer encryption keys (PEKs), a PEK pair generated by the 1st peer comprises a transmission PEK Tx1 and a reception PEK Rx1 and a PEK pair generated by the 2nd peer comprises a transmission PEK Tx2 and a reception PEK Rx2, wherein each peer receives a respective input keying material and generates a respective PEK pair independently from another peer;
   wherein in order to verify that both peers are in possession of equivalent PEK pairs generated by the 1st peer and the 2nd peer:
      the 1st peer is configured to generate a first handshake (HS) message encrypted by the transmission PEK Tx1 and to send the first HS message to the 2nd peer via the data path, thereby initiating a handshake (HS) process;
      the 2nd peer is configured to decrypt the first HS message using the reception PEK Rx2, upon successful decryption to generate a second HS message encrypted by the transmission PEK Tx2, and to send the second HS message to the 1st peer via the data path; and
      the 1st peer is further configured to decrypt the second HS message using the reception PEK Rx1, wherein a successful decryption of the second HS message confirms the successful completion of the HS process; and
   wherein the 1st peer and the 2nd peer are further configured to generate the PEK pairs prior and independently of the HS process and to use said PEK pairs to become, upon successful completion of the HS process, in possession of equivalent pairs of session encryption keys (SEKs).

14. The computing system of claim 13, wherein the input keying material is hybrid and comprises two or more keying materials received, independently by each peer, from two or more sources of keying material (SKMs).

15. The computing system of claim 14, wherein at least two keying materials comprised in the hybrid input material are received with different frequencies defined by a rollover policy.

16. The computing system of claim 13, wherein each peer is configured to generate the respective PEK pair responsive to receiving an update of the input keying material.

17. The computing system of claim 13, wherein each HS message comprises an encrypted payload and data informative of encapsulation overhead corresponding to a communication protocol implemented for communicating data packets via the data path.

18. The computing system of claim 13, wherein each HS messages bears a special mark making the HS message distinguishable within a traffic flow via the data path.

19. The computing system of claim 13, wherein the values of keys in PEK pairs are used as keying material for further deriving, by the peers, values of respective keys in SEK pairs with the help of a preconfigured key derivation function.

20. A non-transitory computer readable medium comprising instructions that, when executed by a computing system comprising a first peering computer ($1^{st}$ peer) and a second peering computer ($2^{nd}$ peer) configured to communicate via a data path, cause the computing system to perform a method of establishing encryption keys for communicating between the $1^{st}$ peer and the $2^{nd}$ peer, the method comprising:
   a. by each peer, using input keying material to generate a pairs of peer encryption keys (PEKs), a PEK pair generated by the $1^{st}$ peer comprises a transmission PEK Tx1 and a reception PEK Rx1 and a PEK pair generated by the $2^{nd}$ peer comprises a transmission PEK Tx2 and a reception PEK Rx2, wherein each peer receives a respective input keying material and generates a respective PEK pair independently from another peer;
   b. running a handshake (HS) process to verify that both peers are in possession of equivalent verifying equivalence of the PEK pairs generated prior and independently of the HS process, the HS process comprising:
      i. by the $1^{st}$ peer, generating a first handshake (HS) message encrypted by the transmission PEK Tx1 and sending the first HS message to the $2^{nd}$ peer via the data path, thereby initiating the handshake process;
      ii. by the $2^{nd}$ peer, decrypting the first HS message using the reception PEK Rx2, upon successful decryption generating a second HS message encrypted by the transmission PEK Tx2, and sending the second HS message to the $1^{st}$ peer, wherein the $2^{nd}$ peer sends the second HS message via the data path;
      iii. by the $1^{st}$ peer, decrypting the second HS message using the reception PEK Rx1, wherein a successful decryption of the second HS message confirms the successful completion of the HS process; and
   c. upon successful completion of the HS process, using by the $1^{st}$ peer and the $2^{nd}$ peer said PEK pairs to become in possession of equivalent pairs of session encryption keys (SEKs).

* * * * *